US012692982B2

(12) United States Patent
VanOyen

(10) Patent No.: US 12,692,982 B2
(45) Date of Patent: Jul. 28, 2026

(54) SPACE CONFORMABLE PRESSURIZED GAS STORAGE SYSTEM

(71) Applicant: Quantum Fuel Systems LLC, Lake Forest, CA (US)

(72) Inventor: Hans VanOyen, Lake Forest, CA (US)

(73) Assignee: QUANTUM FUEL SYSTEMS LLC, Lake Forest, CA (US)

(*) Notice: Subject to any disclaimer, the term of this patent is extended or adjusted under 35 U.S.C. 154(b) by 0 days.

(21) Appl. No.: 18/812,410

(22) Filed: Aug. 22, 2024

(65) Prior Publication Data

US 2024/0410525 A1 Dec. 12, 2024

Related U.S. Application Data

(63) Continuation of application No. 17/908,384, filed as application No. PCT/US2020/020912 on Mar. 4, 2020, now abandoned.

(51) Int. Cl.
*F17C 1/06* (2006.01)

(52) U.S. Cl.
CPC ........ *F17C 1/06* (2013.01); *F17C 2201/0109* (2013.01); *F17C 2201/0119* (2013.01); *F17C 2201/056* (2013.01); *F17C 2203/0604* (2013.01); *F17C 2203/0619* (2013.01); *F17C 2203/0621* (2013.01); *F17C 2203/0636* (2013.01); *F17C 2203/066* (2013.01); *F17C 2203/0668* (2013.01); *F17C 2203/067* (2013.01); *F17C 2205/0142* (2013.01); *F17C 2205/0146* (2013.01); *F17C 2209/234* (2013.01); *F17C 2221/012* (2013.01);
(Continued)

(58) Field of Classification Search
CPC ................ F17C 1/06; F17C 2203/0604; F17C 2203/0668; F17C 2203/067; F17C 2201/0109; F17C 2201/0119; F17C 2203/0619; F17C 2203/0621; F17C 2205/0142; F17C 2205/0146; F17C 2209/234
See application file for complete search history.

(56) References Cited

U.S. PATENT DOCUMENTS

| | | | | |
|---|---|---|---|---|
| 10,465,848 | B1 * | 11/2019 | Newhouse ................ | F17C 1/04 |
| 2004/0226607 | A1 | 11/2004 | Hervio et al. | |

(Continued)

FOREIGN PATENT DOCUMENTS

| | | | |
|---|---|---|---|
| EP | 0812293 | B1 | 6/2002 |
| ES | 1240505 | U | 2/2020 |

(Continued)

OTHER PUBLICATIONS

International Patent Application No. PCT/US2020/020912; Int'l Search Report and the Written Opinion; dated Nov. 26, 2020; 17 pages.

(Continued)

*Primary Examiner* — Don M Anderson
(74) *Attorney, Agent, or Firm* — BAKER HOSTETLER LLP

(57) ABSTRACT

A pressurized-gas storage vessel includes a liner defining a chamber therein, the chamber being configured to receive a gas; a first wrapping surrounding the liner; and a second wrapping surrounding the liner. Methods of manufacturing and using the storage vessel are also disclosed.

11 Claims, 14 Drawing Sheets

(52) U.S. Cl.
CPC .................. *F17C 2221/033* (2013.01); *F17C 2223/0123* (2013.01); *F17C 2223/036* (2013.01); *F17C 2270/0168* (2013.01)

(56) References Cited

U.S. PATENT DOCUMENTS

| | | | | |
|---|---|---|---|---|
| 2009/0090726 | A1* | 4/2009 | Kawamata | F17C 1/06 220/586 |
| 2010/0212815 | A1* | 8/2010 | Kanach | F17C 1/16 156/172 |
| 2013/0092311 | A1 | 4/2013 | Kobayashi | |
| 2017/0254477 | A1* | 9/2017 | Schimenti | F17C 13/06 |
| 2018/0195669 | A1 | 7/2018 | Sawai | |
| 2018/0283609 | A1* | 10/2018 | Teruhira | B29C 53/602 |
| 2018/0283611 | A1* | 10/2018 | Bernard | F17C 1/16 |
| 2018/0299073 | A1 | 10/2018 | Iwano et al. | |
| 2018/0299074 | A1* | 10/2018 | Iwano | F17C 13/06 |
| 2018/0340655 | A1* | 11/2018 | Lee | F17C 13/002 |
| 2019/0301676 | A1* | 10/2019 | Sawai | F17C 1/005 |
| 2020/0116304 | A1* | 4/2020 | Lee | F17C 1/06 |

FOREIGN PATENT DOCUMENTS

| | | | |
|---|---|---|---|
| FR | 2825974 | B1 | 11/2003 |
| JP | H10-220691 | A | 8/1998 |
| JP | 2002-340291 | A | 11/2002 |
| JP | 2012-159158 | A | 8/2012 |
| JP | 2019-173937 | A | 10/2019 |
| WO | WO 2000/024669 | A1 | 5/2000 |
| WO | WO 2006/004136 | A1 | 1/2006 |
| WO | WO 2012/104690 | A1 | 8/2012 |

OTHER PUBLICATIONS

International Patent Application No. PCT/US2020/020912; Int'l Preliminary Report on Patentability; dated Sep. 6, 2022; 11 pages.

European Patent Application No. 20923538.1; Extended Search Report; dated Oct. 30, 2023; 8 pages.

European Patent Application No. 24176463.8; Extended Search Report; dated Oct. 15, 2024; 13 pages.

* cited by examiner

SPACE CONFORMABLE PRESSURIZED GAS STORAGE SYSTEM

The present application is a Continuation of application Ser. No. 17/908,384, filed Aug. 31, 2022, which is a 371 National Stage of International Patent Application No. PCT/US2020/020912, filed Mar. 4, 2020, the disclosures of which are incorporated by reference herein in their entirety.

TECHNICAL FIELD

This disclosure relates to improved axial load management in space conformable pressurized-gas storage vessels.

BACKGROUND

There has been a growing push for green energy containers for use in automotive industry. Automotive companies have invested in fuel cell technology to meet the tough emission challenges set by the governments all over the globe. Fuel cell technology relies on hydrogen gas as its fuel source. The gas (such as hydrogen gas, compressed natural gas, or other suitable gas) has to be stored on vehicles in a high pressure tank. High density hydrogen storage is a challenge for stationary and portable applications and remains a significant challenge for transportation applications. Presently available storage options typically require large-volume systems that store hydrogen in gaseous form. Fuel cell-powered vehicles require enough hydrogen for long ranges of driving, which requires many kilograms of hydrogen required to meet the driving range for light duty vehicles. Existing tanks are either inefficient or are very expensive to manufacture.

Problem: Existing wrappings on tanks can reinforce the tank from circumferential load, but they are not efficient in reinforcing the tank from axial load. The curved or dome-shaped portions of the tanks are difficult to wrap with existing wrappings, and a greater-than-necessary number of layers of wrapping is used to make up for the difficulties of wrapping and the inefficiencies of axial load handling.

There is a need for cheaper methods of forming and maintaining high-pressure gas tanks.

SUMMARY

By lowering the helical layers and in improving storage density of pressurized composite fluid (e.g. gas) storage tanks, traditional problems may be solved. Tanks disclosed herein, in some aspects are covered in a separate wrapping that includes unidirectional fibers that are wrapped along the axis of the tank and handle the axial load. This allows for a reduction or elimination of the less-efficient wrappings that are currently used in the field.

The foregoing needs are met by the various aspects of pressurized-gas storage vessels disclosed. According to an aspect of the disclosure, a pressurized-gas storage vessel includes a liner defining a chamber therein, the chamber being configured to receive a gas; a first wrapping surrounding the liner; and a second wrapping surrounding the liner. The first wrapping may be between the second wrapping and the liner. The storage vessel may have a first end and a second end opposite the first end. The storage vessel may be cylindrical and may define a central axis extending between the first and second ends through the center of the chamber. The vessel may include a first end cap at the first end and a second end cap at the second end. In some aspects, at least one of the first and second end caps may define a channel configured to receive the second wrapping. The vessel may include a plurality of second wrappings in some aspects. For example, the vessel may include two second wrappings that are disposed to intersect one another on the first and second end caps. The vessel may include a port in fluid communication with the chamber, the port being openable to atmosphere. An actuator may be disposed on the vessel for selectively opening and closing the port. The actuator may have an open configuration and a closed configuration, wherein in the open configuration, the gas is permitted to pass through the actuator, and in the closed configuration, the gas is prevented from passing through the actuator. In some aspects, the actuator may be disposed on one of the first and second end caps. One of the first wrapping and the second wrapping may be configured to resist pressure extending radially from the chamber in a first direction perpendicular to the central axis, while the other of the first wrapping and the second wrapping may be configured to resist pressure extending axially from the chamber in a second direction parallel to the central axis. The first wrapping may be configured to resist pressure extending radially, and the second wrapping may be configured to resist pressure extending axially. In some aspects, the liner may include steel, aluminum, plastic, or a combination of the above materials. The liner may be corrosion-resistant to natural gas and hydrogen gas. In some aspects, the end cap may include steel, aluminum, plastic, or a combination of the above materials. The gas received in the chamber may be hydrogen gas, natural gas, or another gas. In some aspects, at least one of the first and second end caps may be dome-shaped. The first wrapping and/or the second wrapping may include a plurality of carbon fibers held together by a resin. In some aspects, the first wrapping may include between 30 and 150 total plies or between 60 and 120 total plies. In some aspects where the first wrapping includes both hoop style and helical style wrappings, the hoop style wrapping may comprise more than 50% of the first wrapping. In some aspects, the hoop style wrapping may comprise more than 75% of the first wrapping. In other aspects, the hoop style wrapping may comprise more than 90% of the first wrapping. Optionally, the first wrapping is devoid of helical style wrappings and includes only hoop style wrappings. In some aspects, the first wrapping may include other fibers, such as glass or basalt.

According to another aspect of the disclosure, a pressure vessel assembly may include a first pressurized-gas storage vessel defining a first chamber therein, the first chamber being configured to receive a gas; a second pressurized-gas storage vessel defining a second chamber therein, the second chamber being configured to receive a gas; and a passage extending between the first and the second pressurized-gas storage vessels, such that the first chamber and the second chamber are in fluid communication. The assembly may optionally further include a valve in fluid communication with the passage, the valve having an open configuration and a closed configuration, wherein in the open configuration, the gas from at least one of the first chamber and the second chamber is permitted to move through the valve, and in the closed configuration, the gas from at least one of the first chamber and the second chamber is precluded from moving through the valve. The first pressurized-gas storage vessel may include a first liner that defines the first chamber therein, a first wrapping disposed around the first liner, and a second wrapping disposed around the first wrapping on the first liner, and the second pressurized-gas storage vessel may include a second liner that defines the second chamber therein, a first wrapping disposed around the second liner, and a second wrapping disposed around the first wrapping on the first liner. Each of the first and second pressurized-gas storage vessels may be cylindrical. The assembly may further optionally include a first end cap at a first end of the assembly and a second end cap at a second end of the assembly opposite the first end, such that the first and second pressurized-gas storage vessels are disposed between the first and second end caps. The first end cap and the second end cap may define a channel configured to receive the second wrapping. In some aspects, a projection may extend from the assembly, the projection being configured to receive the second wrapping thereon. The projection may extend from each of the first and second end cap. In some aspects, each of the first and second end caps may include a plurality of the projections. Optionally, the assembly may include a sleeve configured to receive the assembly therein.

According to another aspect of the disclosure, a method of forming a pressurized-gas storage vessel configured to receive a gas therein includes the steps of providing a liner having a first end and a second end opposite the first end, the liner defining a chamber therein and defining a central axis extending through the center of the chamber between the first end and the second end; applying a first wrapping circumferentially around the liner, the first wrapping including a plurality of fibers being arranged radially around the central axis; and applying a second wrapping around the liner axially, the second wrapping including a plurality of fibers, wherein at least some of the plurality of fibers of the second wrapping are parallel to the central axis. The step of applying the first wrapping may be repeated a predetermined number of times. The step of applying the second wrapping may be repeated a predetermined number of times. The pressurized-gas storage vessel may further include a first end cap at the first end and a second end cap at the second end, and the step of applying the second wrapping may include disposing the second wrapping in a channel defined on the first end cap and the second end cap. Optionally, the method may include the step of introducing a gas into the chamber defined by the liner.

BRIEF DESCRIPTION OF THE DRAWINGS

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed. In the drawings.

Figure 1:
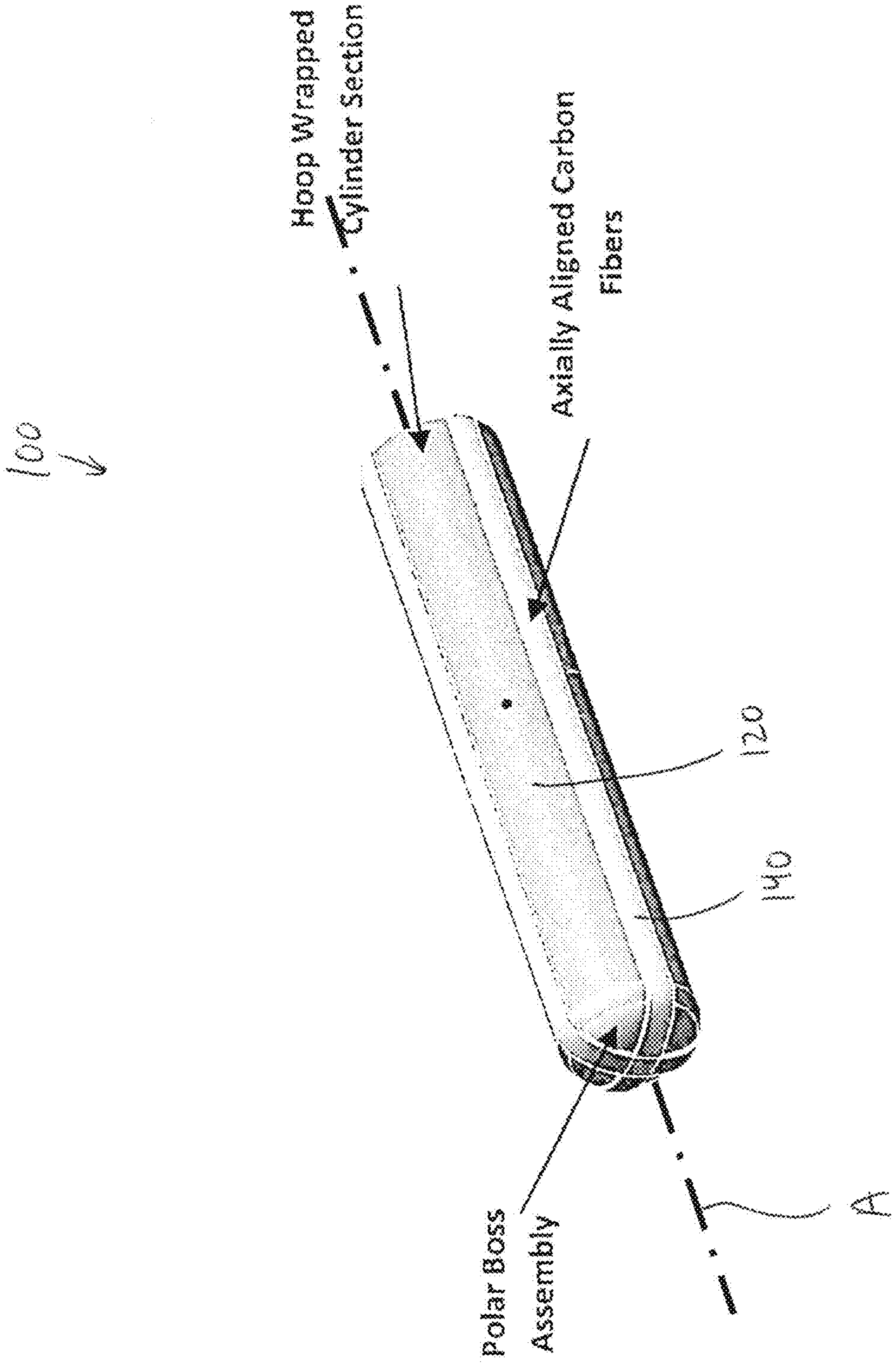
FIG. 1 depicts an isometric perspective view of a vessel according to an aspect of the disclosure.

Aspects of the disclosure will now be described in detail with reference to the drawings, wherein like reference numbers refer to like elements throughout, unless specified otherwise Since the single major cost factor is fiber in manufacturing a COPV (60%-75%), it will be ideal to have a high strength, high modulus fiber at fraction of the current typical fiber cost. Older pressure vessels are not as efficient as newer types, but the newer types are more expensive to manufacture and maintain. A typical filament wound composite overwrapped pressure vessel (COPV) constitutes of thick overwrap, plastic liner and metallic fittings. The overwrapped structure is a combination of structural fibers and a resin. Continuous fibers provide tensile strength for structural integrity, while the resin carries shear loads in the composite and maintains the fiber position. As the fiber/resin composite is generally not considered pressure tight, the composite is applied over a fluid-retention barrier that serves as an interior liner for the composite. These fluid-retention barriers may be a rubber, plastic, or thin ductile metal liner. These liners serve to maintain acceptable leak rates and fluid purity but add little, if any, structural integrity. For lightweight, high-efficiency applications, the COPVs offer a significant weight advantage, approximately one-half the weight of a comparable metal tank. Most performance-efficient and cost-effective tank design efforts focus on use of less expensive carbon fibers or hybrid (carbon+glass) fibers.

The majority of the filament winding is done using similar wind patterns that include hoop and helical layers. The hoop layers take the circumferential load, while the helical layers take the axial load. The filament winding process also includes use of high-angle helical layers that take both hoop and axial load. The high-angle layers reinforce the dome-cylinder transition area (for example, where the cap or boss are). The hoop layers are very efficient in reinforcing the cylinder section from circumferential load; however, they are very inefficient in reinforcing the cylinder from axial load. They are difficult to wind over curved shapes, such as geodesic isotensoid dome shapes. Helical layers may be used to overcome the shortcomings of hoop layers and improve the axial stress carrying capability by the composite overwrap. The number of helical layers is usually more than required in a tank.

Helical layers are either low- or high-angle helical layers. The low angle helical layers mostly take the axial load and are used to hold the metal fittings near the polar openings of the COPV. The continuous filament winding process requires tank manufacturers to wind low-angle helical layers over the cylinder section. These low-angle helical layers add unnecessary weight and reduce the storage volume of the tanks (for fixed external tank dimensions).

There is a need to look into solutions to drive the cost down of a high pressure Type IV COPV by lowering the helical layers. It is also preferable to improve the storage density of the tanks. This disclosure describes various storage vessels, wrappings, and methods of manufacturing and utilizing aspects having unidirectional fibers wrapped externally along the axis of the tank that help take the axial load more efficiently, and thus allowing to reduce the quantity of low-angle helical layers. The approach takes benefit of the fact that fibers are most efficient when the load is applied along the fiber length.

Breaking down a COPV (material and manufacturing process) to its constituents can help isolate weak design areas where improvements can be made. The constituents are fiber, resin, and liner. The filament winding process should also be considered. Since the single major cost factor is fiber in manufacturing a COPV (60%-75%), it is preferable to have a high-strength, high-modulus fiber at a cheaper cost than the existing fiber options.

The resin component can also be enhanced to improve load transfer capabilities of the composite overwrap, and thus help in reducing the amount of fiber needed for the desired thickness and axial load requirements.

Filament winding consists of wet (resin impregnated fiber) and dry (towpreg) winding types. The dry winding is a more expensive process compared to wet winding. However, the dry winding allows for more control and consistent wind patterns. Both wet and dry filament winding of composite shells involve the winding of hoop and helical layers over a liner. The hoop winding supports the hoop stress and reinforces the cylinder section of the pressure vessel. This defines the burst capability of the tank. The helical winding supports the axial load on the pressure vessel. Helical winding reinforces mostly the dome section of the pressure vessel. The helical winding consists of high- and low-angle helical windings. The high-angle windings, along with the hoop windings, reinforce the cylinder-dome transition area. The low-angle helical windings hold the polar boss near the opening. The polar opening section can be the thickest section in the pressure vessel as it builds in thickness near the polar opening. The higher the internal pressure of the vessel, the more low-angle helical layers are required to reinforce the polar opening area to hold the metallic boss. The low-angle helical layers are needed to reinforce the dome section and, in part, the cylinder section. The low-angle helical layers in the cylinder section may add to the weight of the vessel/tank and result in lowering the storage density of the tank. For example, in some existing aspects, an optimized 122 L hydrogen tank design (500 mm×1000 mm) consists of total 95 plies 52 helical plies and only 43 hoop plies of hoop.

Disclosed are aspects of storage vessels that include axially oriented carbon fiber to replace some or all of the low-angle helical layers. Since these axially oriented carbon fibers are disposed along the axis of the tank, the carbon fibers can take the axial load within the tank efficiently.

Referring to FIGS. 1-4, a vessel 100 includes a liner 102 that defines a chamber 106 therein. The chamber 106 is configured to receive and hold a gas. The gas may be at various pressures, and it will be appreciated that the vessel 100 is configured to withstand the internal pressure of the gas therein based on the intended use, gas, and pressures. The gas may include, for example, hydrogen gas or natural gas. This disclosure is not limited to the particular gas stored in the disclosed vessels.

The liner 102 may be substantially cylindrical and may be composed of one plastic or metal materials. Plastics may be advantageous due to their low weight and ease of manufacturing. However, it is within the scope of this disclosure that the liner 102 may include a metal, such as steel and/or aluminum. In some aspects, the liner 102 may be a composite or hybrid material. It will be appreciated that the liner 102 should include materials that are non-reactive with the gaseous fuel stored in the chamber 106 that contacts the liner 102, and the liner 102 should be corrosion-resistant to the gas that will be placed therein, for example natural gas and hydrogen gas. The liner 102 is configured to withstand the pressures associated with the compressed gas received into the chamber 106.

The vessel 100 includes end caps 104 at either end (the top and the bottom) of the liner 102. The chamber 106 is defined by the liner 102 and between the top and the bottom end caps 104. The end caps 104 may be part of a single piece component that includes the liner 102, or the end caps 104 may be separate from the liner 102. In some aspects, one of the end caps 104 may be part of a singular piece with the liner 102 while the other end cap 104 is a separate component. The end caps 104 may be composed of the same material as the liner 102, or, alternatively, of a different material. In some aspects, one or both of the end caps 104 may include metal or another rigid and gas-impermeable material. The end cap 104 may include a metal, for example steel or aluminum, a plastic, or a combination of materials.

A seal 114 may be disposed between each end cap 104 and the liner 102. The seal 114 should be impermeable to the specific gas with which the vessel 100 is to be used. The seal 114 should be manufactured from materials that are compatible with the gas inside the chamber 106, such that the seal 114 does not sustain damage from the gas. In some aspects, the liner 102 may be welded or brazed to the end cap 104.

The vessel 100 may include a port 110 for filling the vessel 100 with the gas or for relieving the gas from inside the vessel 100. The port 110 may be disposed on the liner 102 or on one or both of the end caps 104. In some aspects, the vessel 100 may include a plurality of ports 110. An actuator 112 may be disposed adjacent to the port 110 and be configured to selectively open and close the port 110. The actuator 112 may be a suitable valve, such as a check valve, ball valve, gate valve, needle valve, diaphragm valve, or another valve that can be used to selectively allow or prevent gas from passing therethrough.

The vessel 100 is wrapped in a covering that allows the vessel 100 to resist the load from the inside of the vessel and withstand the pressures inside the chamber 106 due to the compressed gas therein. A first wrapping 120 is configured to reinforce the vessel 100 from circumferential load and to resist forces pushing radially outwards from the interior of the vessel 100. The first wrapping 120 includes a plurality of fibers wrapped around the liner 102, the fibers being wrapped radially in the direction around the central axis A depicted in FIG. 1. The first wrapping 120 may include "hoop" wrapping, in which fibers are wrapped around the liner 102 in a radial direction perpendicularly to the central axis A. The first wrapping 120 may also include helical wrappings, in which fibers extend radially and in a spiral around the central axis A. The first wrapping 120 may include carbon fibers adhered or held together by a resin. The hoop-type wrapping is more effective at resisting radially acting forces than the helical-type wrapping, and are thus more important to reinforcing the vessel 100 from circumferential load. The helical-type wrapping is used for resisting axial forces that act parallel to the central axis A, and can help reinforce the cylinder from axial load. The first wrapping 120 may include a plurality of layers or plies as it is wound around the vessel 100. For the purpose of this disclosure, a single ply is equivalent to a layer of fibers that is placed onto the liner 102. A subsequent ply can be placed over the previous ply. The first wrapping 120 can be applied to the vessel 100 in a continuous and uninterrupted process or in separate layers that are sized to correspond to the surface of the body of the liner that needs to be covered. The number of plies of the first wrapping 120 depend on the amount of "hoop" style and "helical" style wrappings that are desired, the expected use of the vessel 100, and the pressure within the chamber 106. In some aspects, the vessel 100 may include between about 30 and about 150 total plies of the first wrapping 120 or between about 60 and 120 total plies of the first wrapping 120. In some aspects, the vessel 100 may include less than about 100 total plies of the first wrapping 120, less than about 70 total plies of the first wrapping 120, or less than about 40 total plies of the first wrapping 120. In some aspects, the first wrapping 120 may include both "hoop" style and "helical" style wrappings. In such aspects, the first wrapping 120 may composed of about 50% or more of hoop style wrappings, about 75% or more of hoop style wrappings, or about 90% or more of hoop style wrappings. In some aspects, the first wrapping 120 may consist entirely of hoop style wrappings and be devoid of helical style wrappings.

The vessel 100 further includes a second wrapping 140 that is used to reinforce the vessel 100 from axial load. The second wrapping 140 is configured to resist forces pushing outwards from the interior of the vessel 100 parallel to the central axis A towards the end caps 104 disposed at either end of the chamber 106. The second wrapping 140 includes carbon fibers that extend along the axial direction of the vessel 100 and are wrapped around the two end caps 104. The carbon fibers may be adhered or held together by a resin. The placement of the second wrapping 140 may be directly over the end caps 104 or adjacent to the end caps 104, as long as tensile force of the fibers in the second wrapping 140 counteracts the force due to pressure inside the chamber 106.

In some aspects, the second wrapping 140 may be shaped as an uninterrupted band that extends around the vessel 100. The second wrapping 140 may have a thickness T and a width W. The thickness of the band may vary, and the specific dimensions and quantity of fibers used will depend on the intended use of the vessel 100, the gas to be used with the vessel 100, and manufacturing capabilities. In some aspects, the vessel 100 may include a plurality of second wrappings 140.

The quantity of second wrappings 140 may depend on various aspects, such as the dimensions of each second wrapping 140, the expected pressure within the chamber 106, the arrangement of the second wrappings 140, or other factors, and this disclosure is not limited to a particular number of second wrappings 140. In some aspects, each vessel 100 may include 1, 2, 3, 4, 5, 6, 7, 8, or another suitable number of second wrappings 140. The second wrapping 140 may be disposed on top of the first wrapping 120, such that the first wrapping 120 is between the second wrapping 140 and the liner 102.

Figure 2:
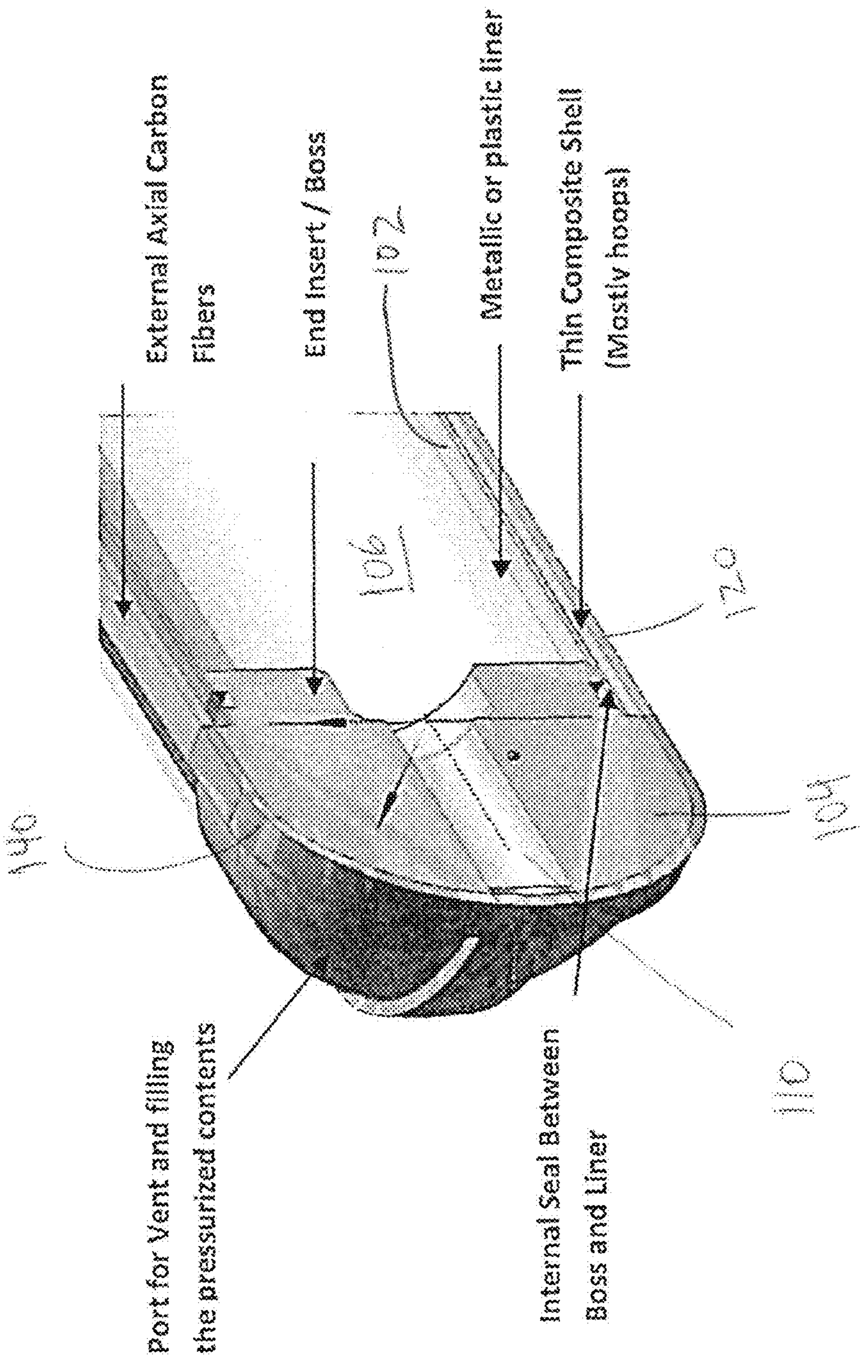
FIG. 2 depicts an isometric cross-sectional view of a portion of the vessel of FIGS. 1; and 2.
Figure 3:
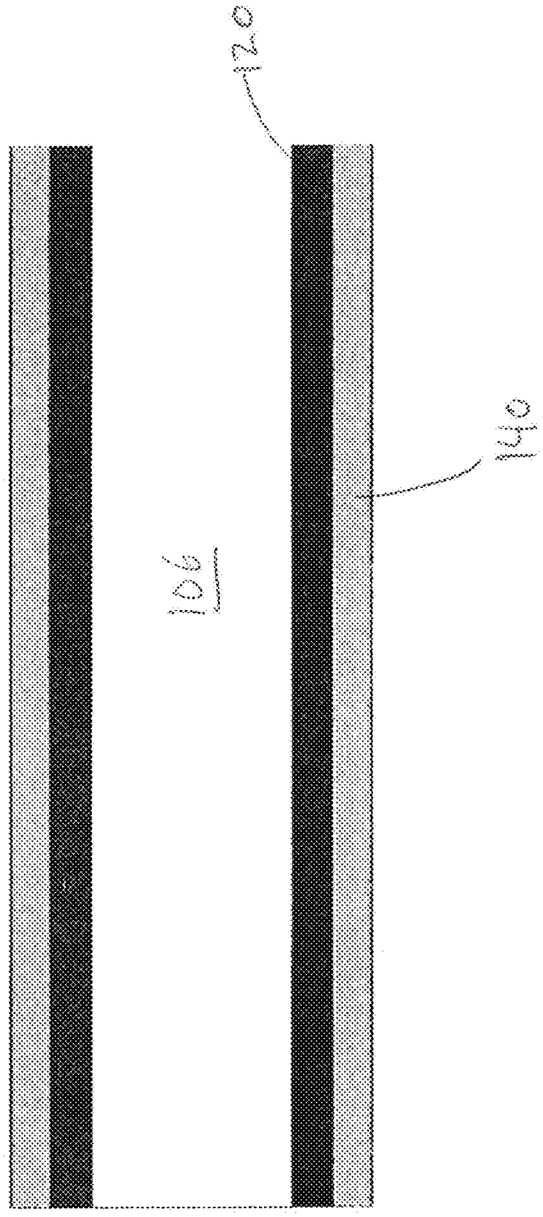
FIG. 3 depicts a side perspective cross-sectional view of the vessel of FIGS. 1 and 2.
Figure 4:
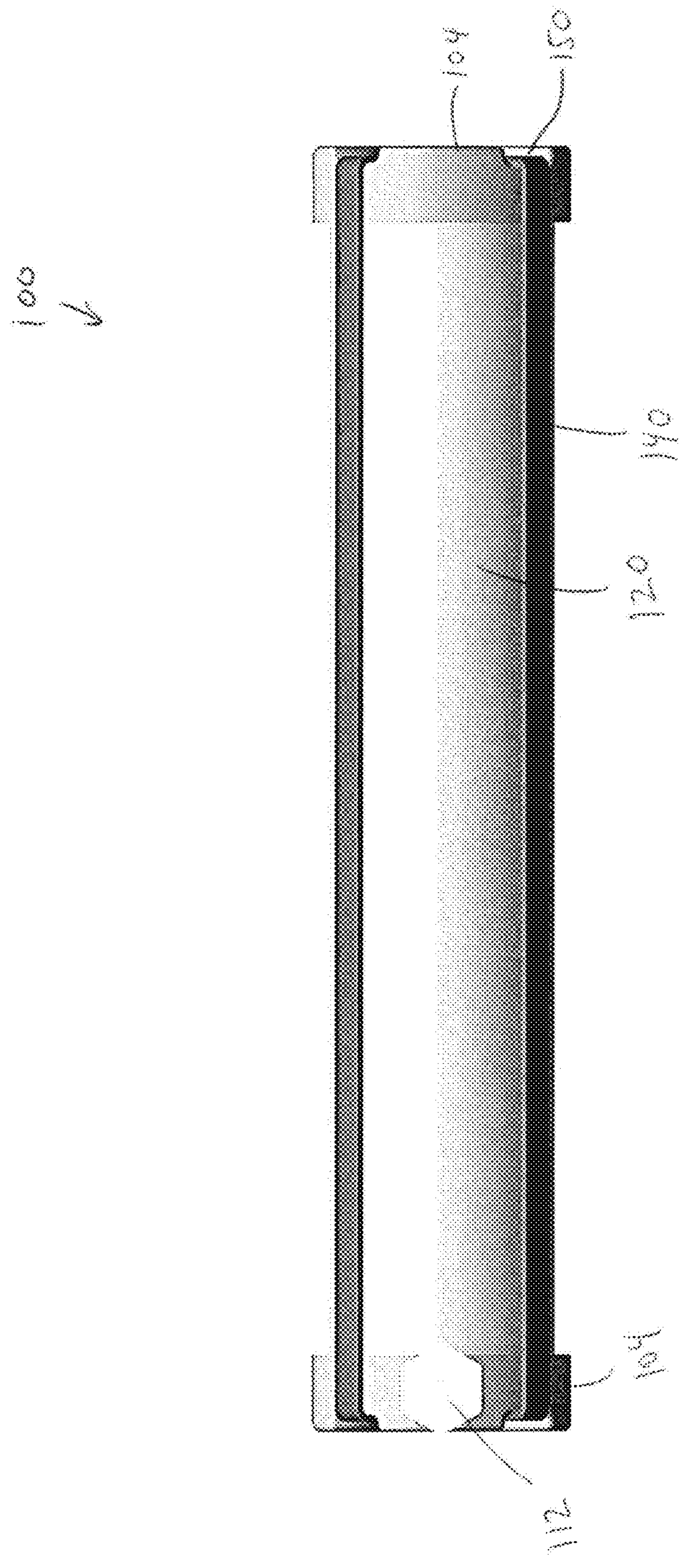
FIG. 4 depicts a side perspective view of a vessel according to another aspect of the disclosure.
Figure 5:
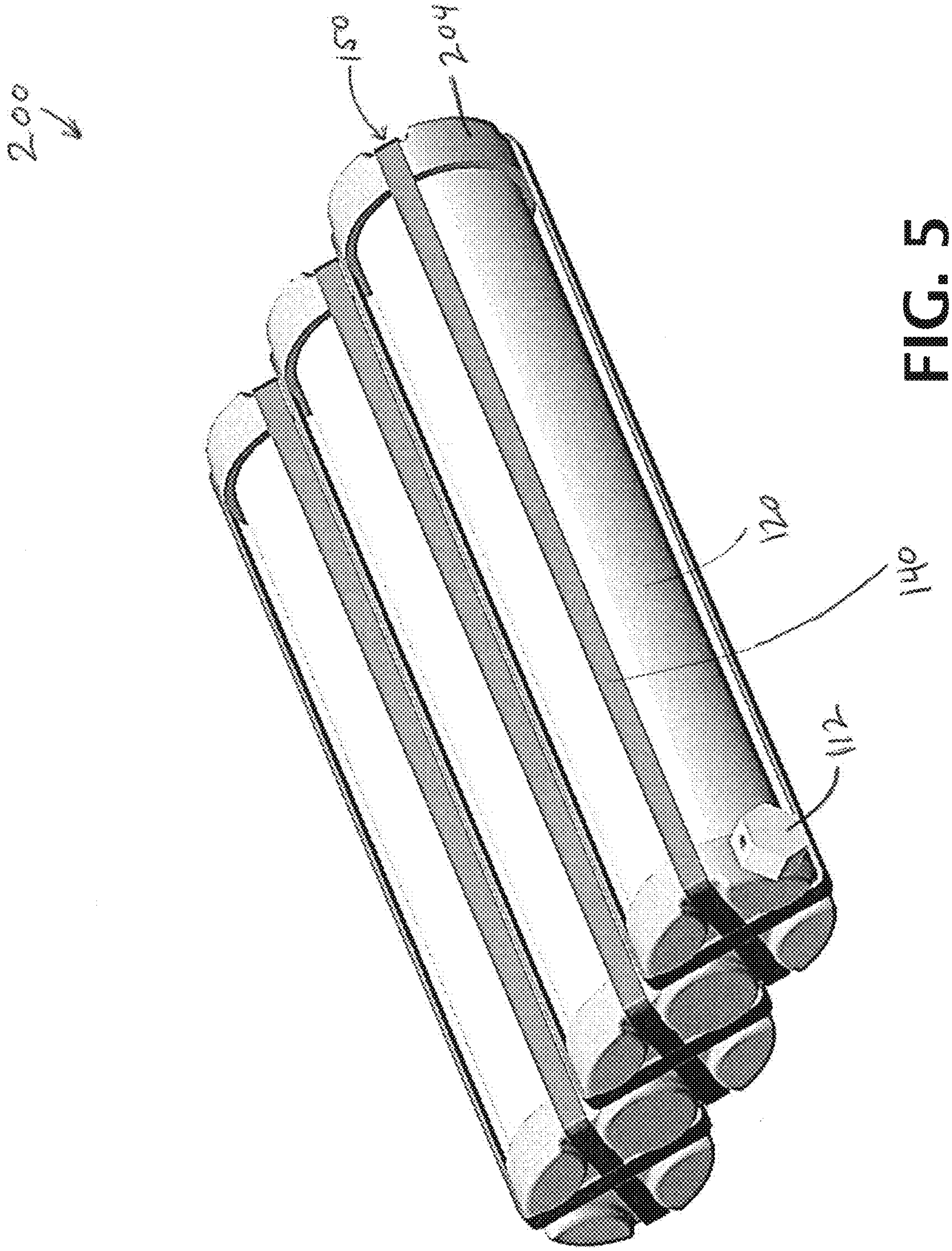
FIG. 5 depicts an isometric view of an assembly of vessels according to an aspect of the disclosure; of FIGS. 5-8.

The end cap 104 may be dimensioned and manufactured to engage with the second wrapping 140. Referring to FIGS. 1-2, the end cap 104 may be hemispherical or dome-shaped, and the second wrappings 140 may extend around the curved portion such that the second wrapping 140 covers the central point of the end cap 104 (e.g. where the second wrapping 140 covers the top of the domed portion).

Other end cap shapes can be used, and the second wrappings 140 may be disposed to pass over the central point of the end cap 104 (i.e. perpendicular to and intersecting with the central axis A) or over another part of the end cap (i.e. not intersecting the central axis A). Referring to FIGS. 4-9, the end cap 104 may include a channel 150 configured to receive the second wrapping 140. The channel 150 is defined by at least two walls 152 and a floor 154 that is perpendicular to the walls 152. The walls 152 may extend from the floor 154. Depending on the intended implementation of the vessel 100, the height of the walls 152 from the floor 154 may be equal to the thickness of the second wrapping 140. Such an arrangement would result in the end cap 104 having a flush surface when the second wrapping 140 is in the channel 150. This may prevent exposed edges of the end cap 104 from catching on loose components, as well as prevent debris from entering the channels 150 and interfering with the second wrapping 140 or another component of the vessel 100. In some aspects, the height of the walls 152 may be greater than the thickness of the second wrappings 140. In such aspects, the channel 150 is deeper than the thickness of the second wrapping 140, which would allow another component to be placed within the channel 150 between the walls 152. For example, another second wrapping 140 may be placed on top of the second wrapping 140 that is in the channel 150. In further alternative aspects, the height of the walls 152 may be less than the thickness of the second wrappings 140. In such arrangements, the second wrapping 140 sticks out over the surface of the end cap 104. This may allow for easier access to the second wrapping 140.

Figure 11:
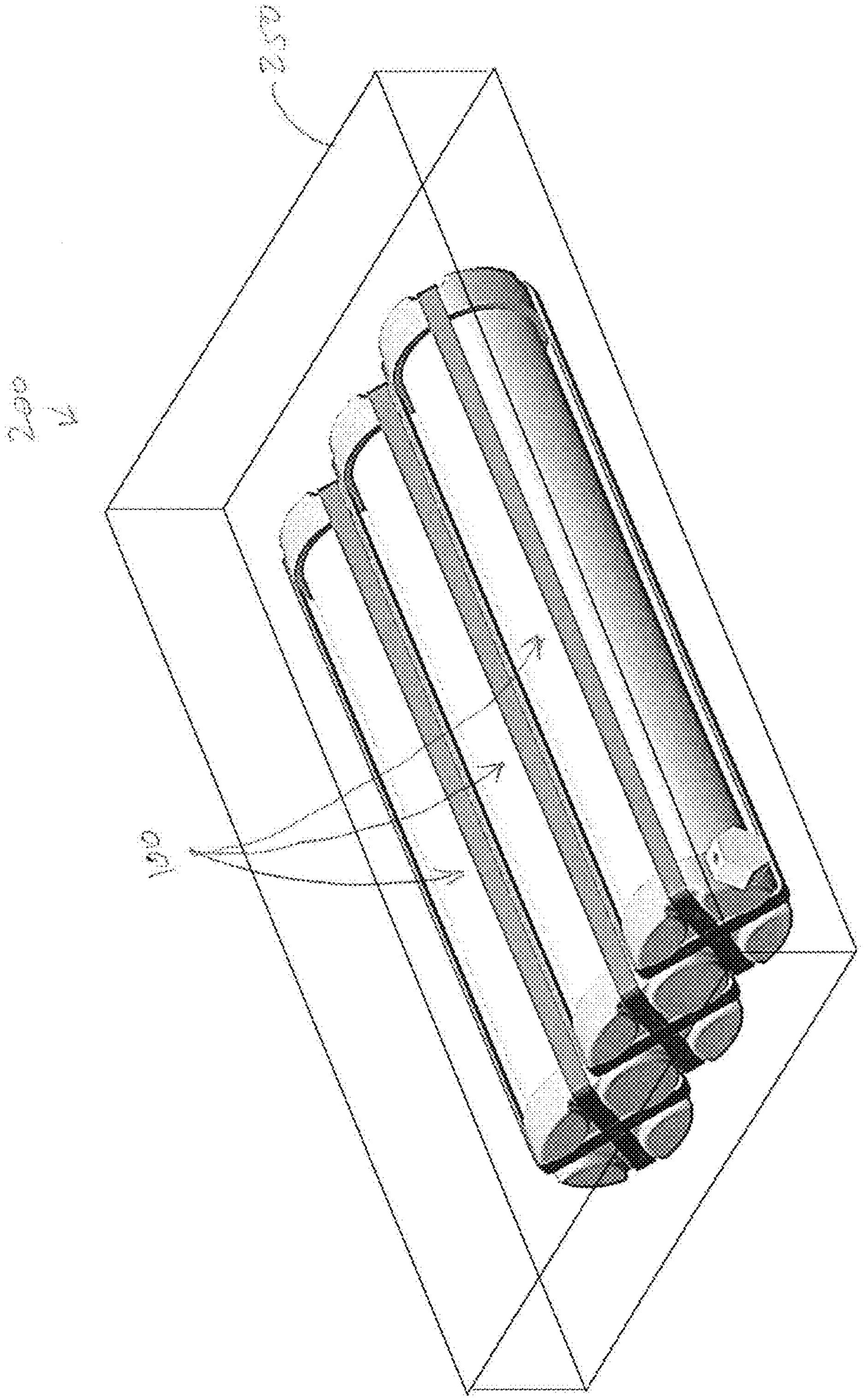
FIG. 11 depicts an assembly of vessels within a sleeve according to another aspect of the disclosure.

In some aspects, multiple vessels 100 may be arranged in a single assembly. The exact quantity of vessels 100 is not limited by this disclosure and may depend on the intended use, the desired quantity of gas they need to contain, or other manufacturing or safety requirements. An assembly may include 1, 2, 3, . . . , 20, or another suitable number of vessels 100. All of the vessels 100 may be the same, or one or more of the vessels 100 may differ from one or more of the other vessels 100 in the assembly. The assemblies of multiple vessels 100 may be organized in various arrangements and may include an optional sleeve or covering 250 into which some or all of the vessels 100 are received (see, e.g., FIG. 11).

Referring to FIGS. 5-11, an exemplary assembly 200 is depicted showing a plurality of vessels 100. Although the figures show three vessels 100, it will be appreciated that any other suitable number of vessels 100 could be utilized. Each vessel 100 in the assembly 200 may have its own one or more second wrappings 140, or multiple adjacent vessels 100 may share the second wrapping 140, for example, where the second wrapping 140 applies tensile force to the end caps 104 of the multiple adjacent vessels 100 that share the second wrapping 140. Each vessel 100 may have its own separate end cap 104, or, alternatively, two or more (or all) of the vessels in the assembly 200 may share an end cap 204. It will be understood that the end cap 204 may have similar functionality as the end cap 104 described throughout this application. In some aspects, the end cap 204 may be a unitary piece. The end cap 204 is configured to receive the second wrapping 140 and to distribute the applied forces from the second wrapping 140 throughout the end cap 204. The second wrapping 140 provides sufficient axial tensile force on the vessel 100 to prevent "blow out" or gas leakage. In some instances, that unitary piece may resemble a plurality of connected caps 104. Multiple second wrappings 140 may extend over the end cap 204. In the exemplary aspect of FIGS. 5-11, each vessel 100 of the assembly 200 has two second wrappings 140 that surround the vessel 100. The second wrappings 140 may extend over the end cap 204 such that the two second wrappings 140 of each vessel 100 intersect each other and the central axis A of each vessel 100.

Figure 6:
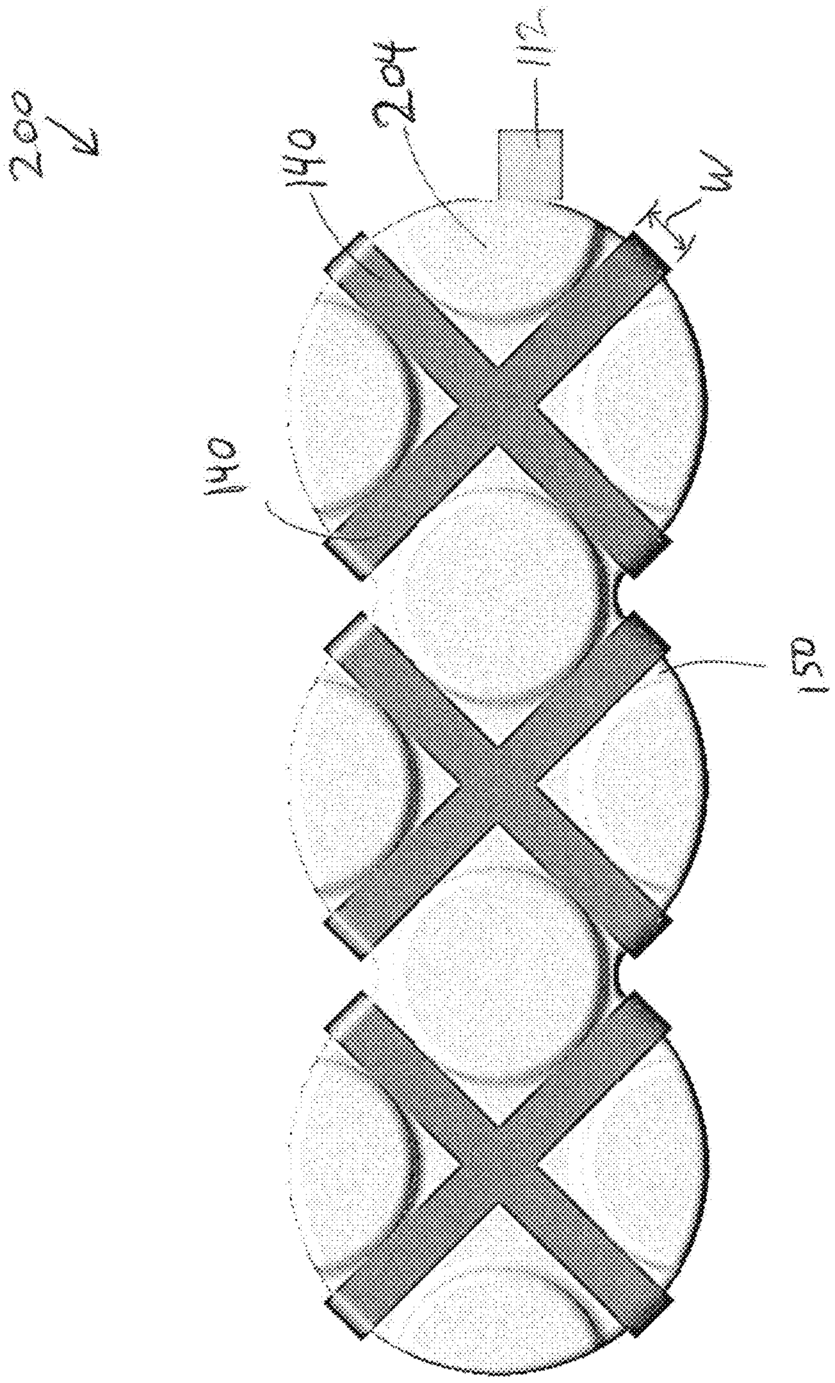
FIG. 6 depicts a front perspective view of the assembly of FIG. 5.
Figure 7:
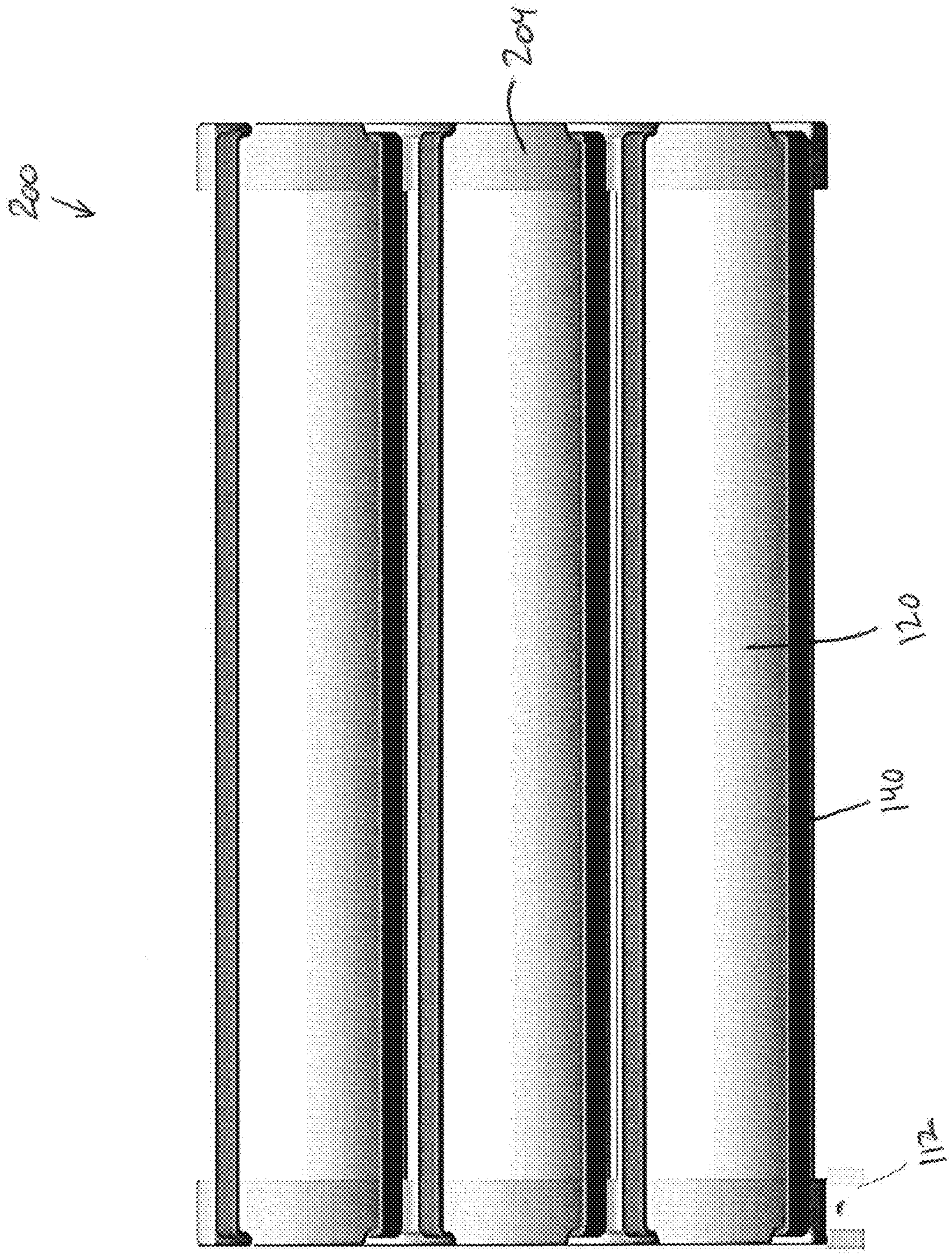
FIG. 7 depicts a top plan view of the assembly of FIGS. 5 and 6.
Figure 8:
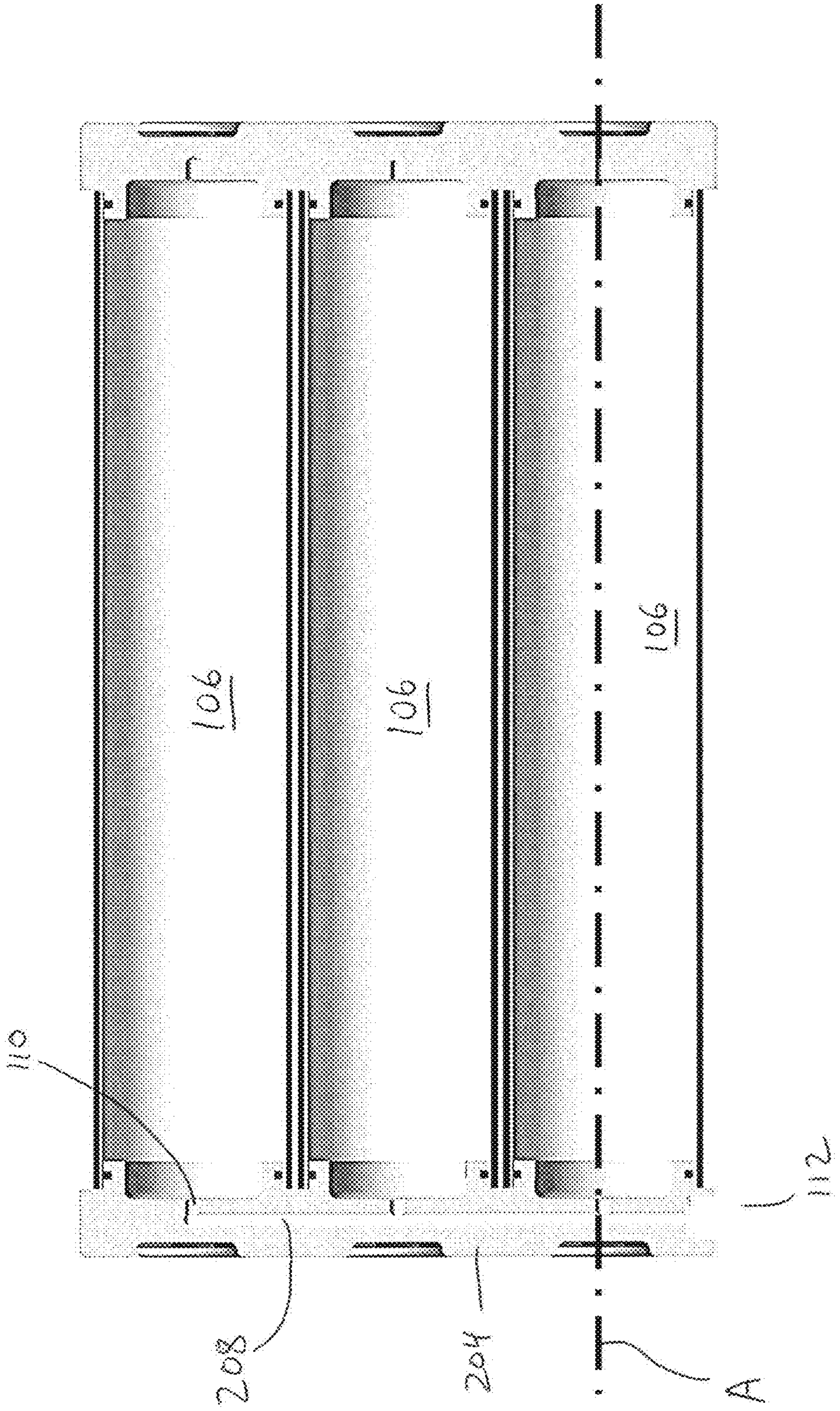
FIG. 8 depicts a top plan cross-sectional view of the assembly of FIGS. 5-7.
Figure 9:
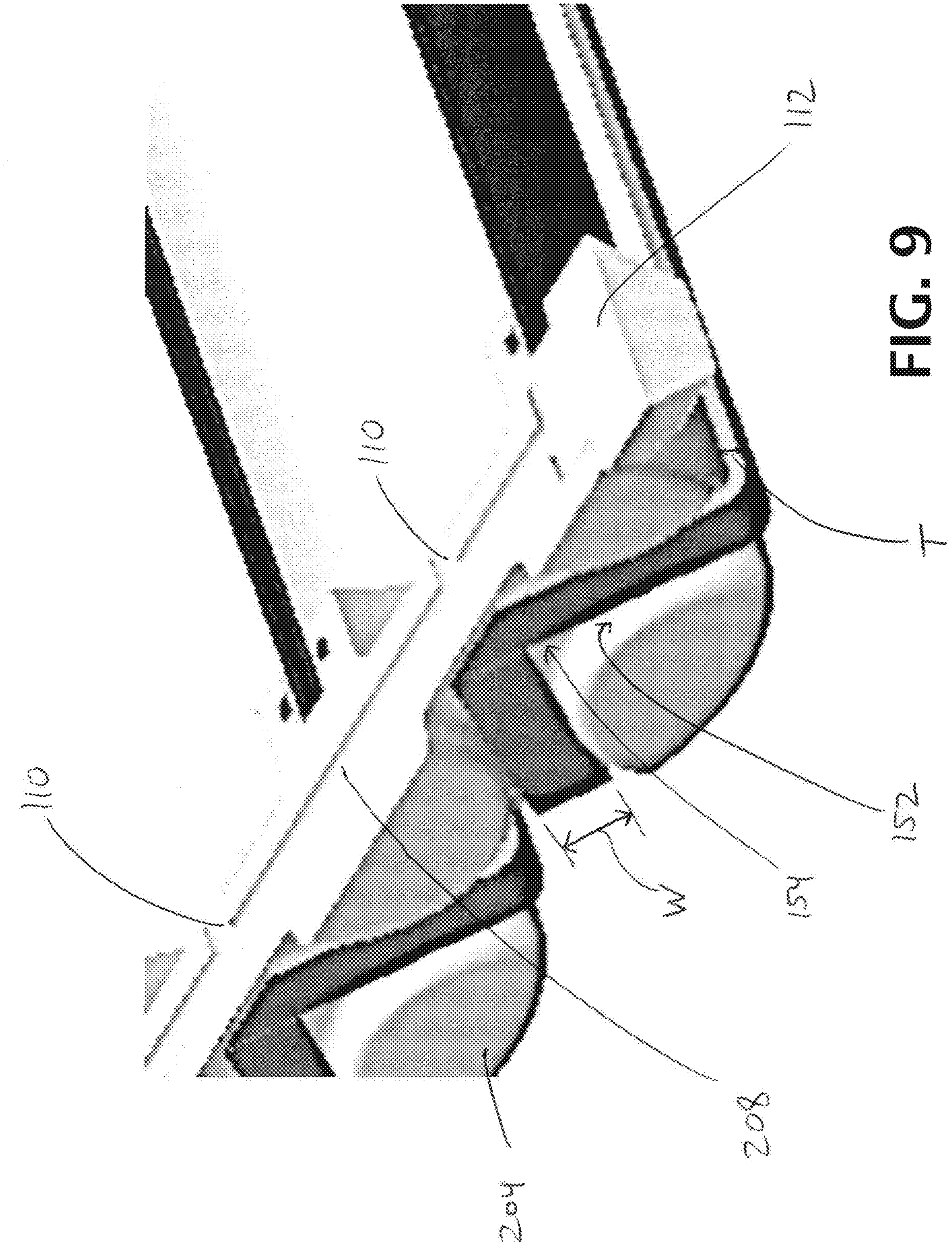
FIG. 9 depicts an isometric cross-sectional view of a portion of the assembly
Figure 10:
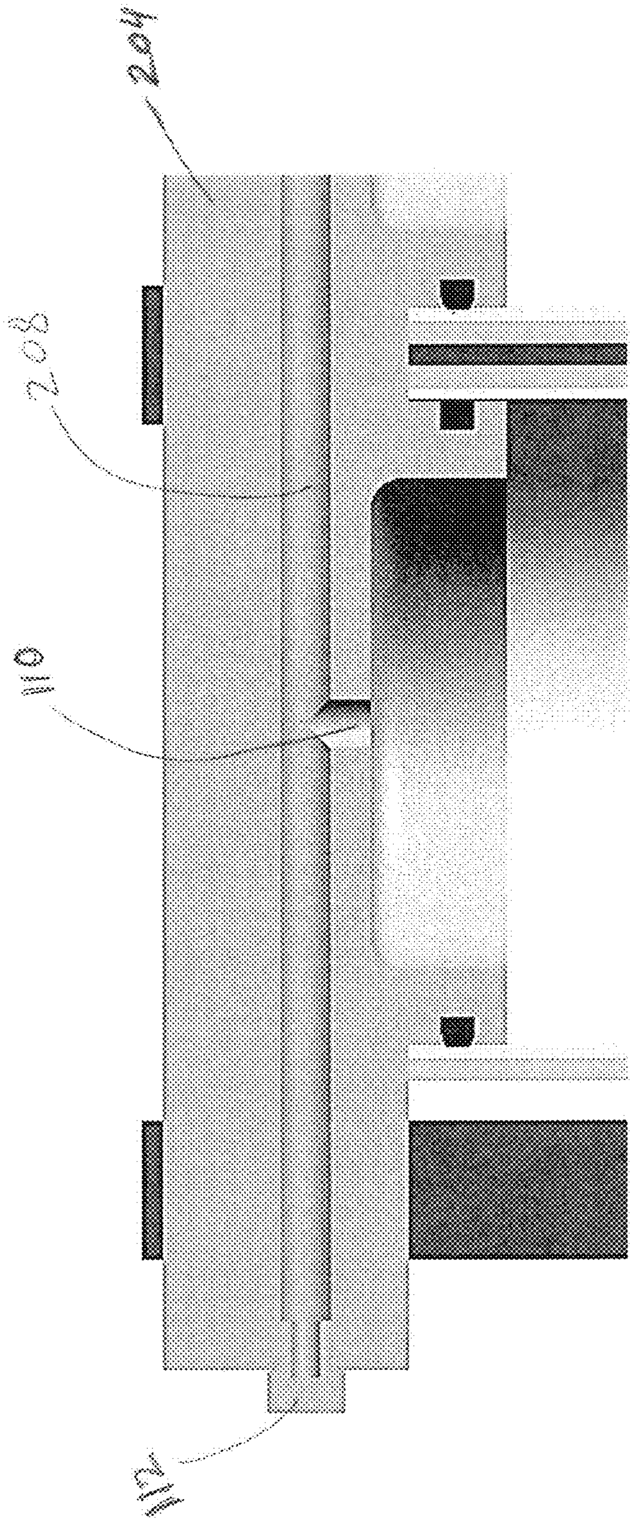
FIG. 10 depicts a top plan cross-sectional view of an end cap of the assembly of FIGS. 5-9.

For example, as shown in FIG. 6, the two second wrappings 140 of each vessel 100 may intersect each other on the surface of the end cap 204 at approximately 90 degree angles to form an X or + shape.

The assembly 200 may be arranged such that the ports 110 of some or all of the vessels 100 are in fluid communication with a shared passage 208, which can be opened or closed with an actuator 112 (or a regulator valve) adjacent to the passage 208. As shown in the exemplary aspect of FIGS. 8-10, the passage 208 may be defined within the end cap 204, and the ports 110 of each of the vessels 100 engaged with the end cap 204 can be fluidly connected to the passage 208. This can allow for better gas distribution among all of the vessels 100 in the assembly 200. Furthermore, such arrangements can be easily accessible to add, remove, or replace vessels 100 within the assembly 200 without having to disassemble many components. It will be appreciated that the assembly 200 may have multiple passages 208 that, for example, fluidly communicate with different individual vessels 100 or sets of vessels 100. Additional actuators 112 may be disposed in fluid communication with each of the passages 208 to selectively open and close the passages 208 and/or control the amount of gas moving into or out of the passage 208. In aspects that include an external sleeve or covering 250, at least a portion of the passage 208, the actuator 112, or both may extend through the covering 250. It will be understood that, in some aspects, a regulator valve can be used in addition to or instead of an actuator 112.

Figure 12A:
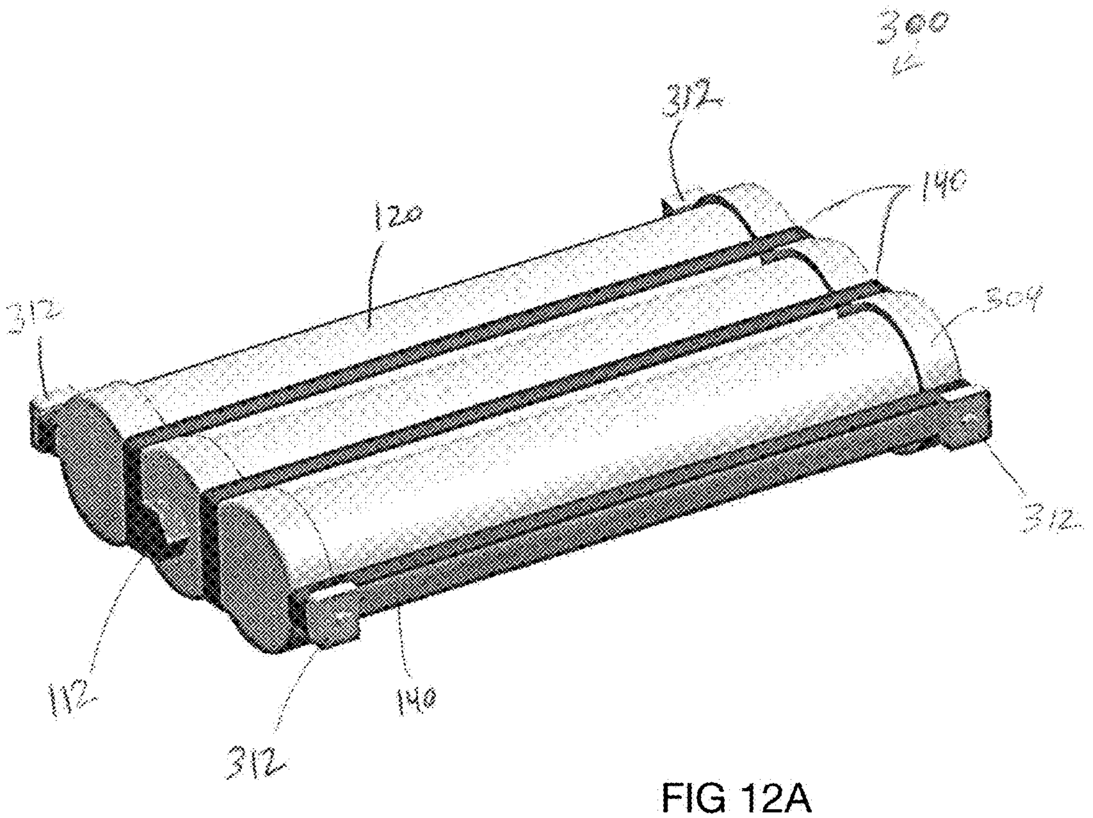
FIGS. 12A and 12B depicts an assembly of vessels perspective view and end view according to another aspect of the disclosure.
Figure 12B:
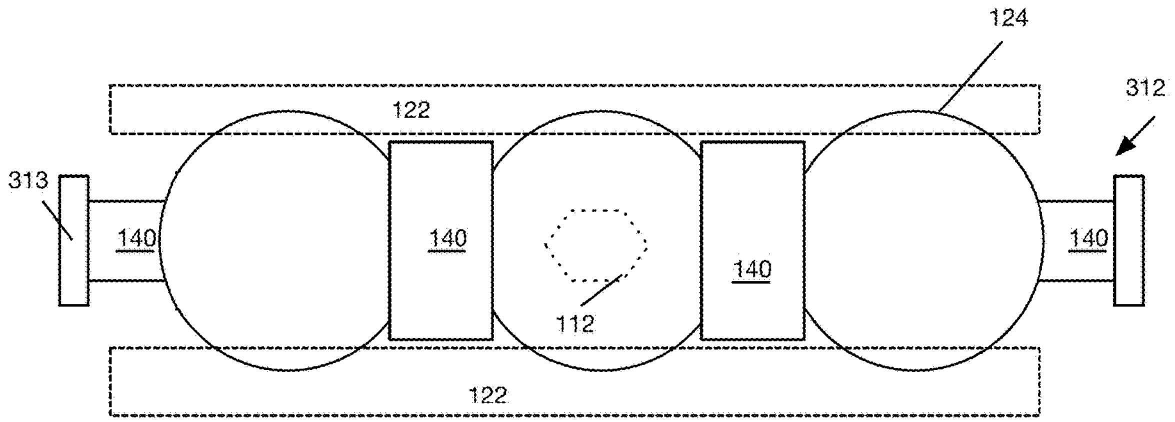
Figure 13:
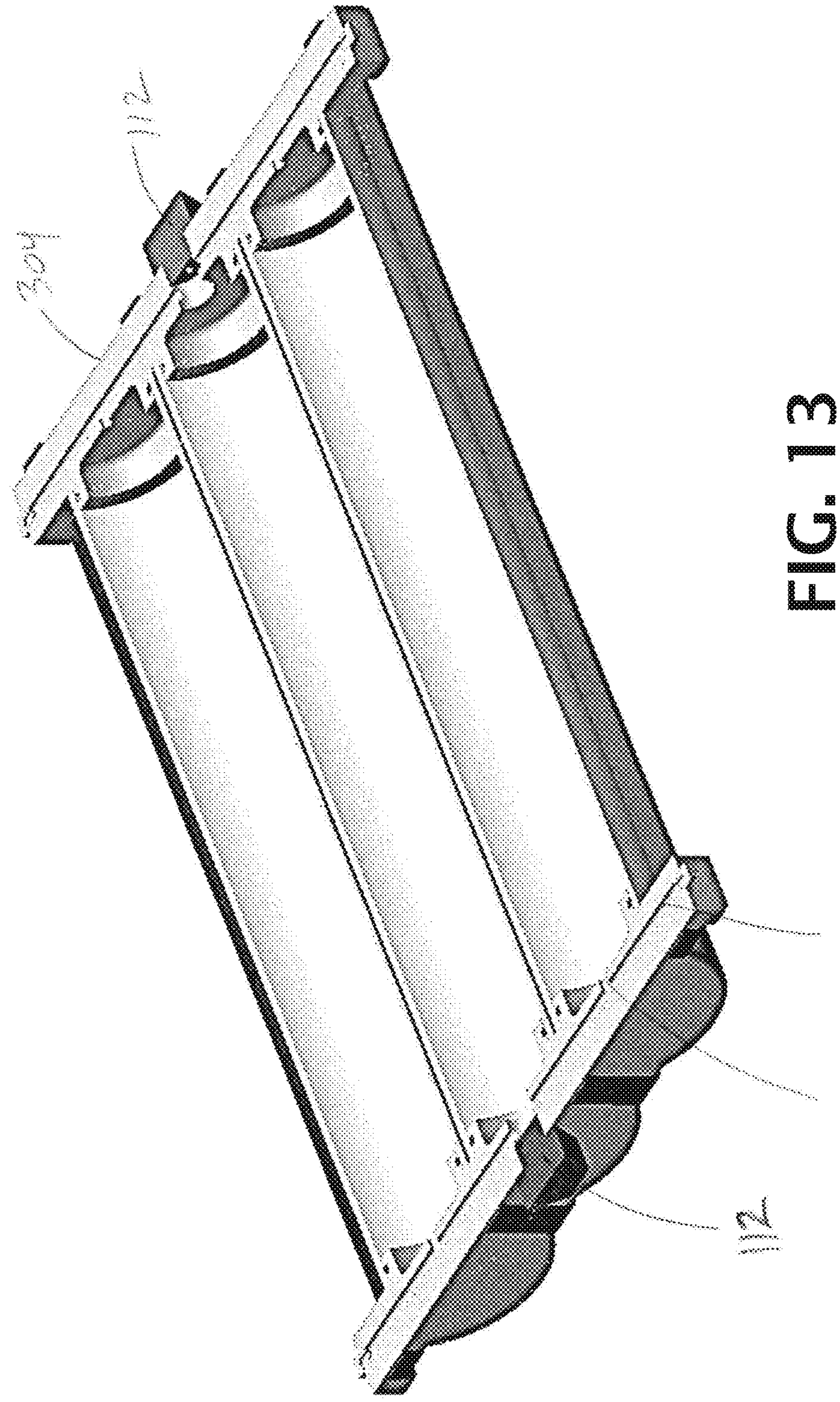
FIG. 13 depicts an isometric cross-sectional view of the assembly of FIG. 12.
Figure 14:
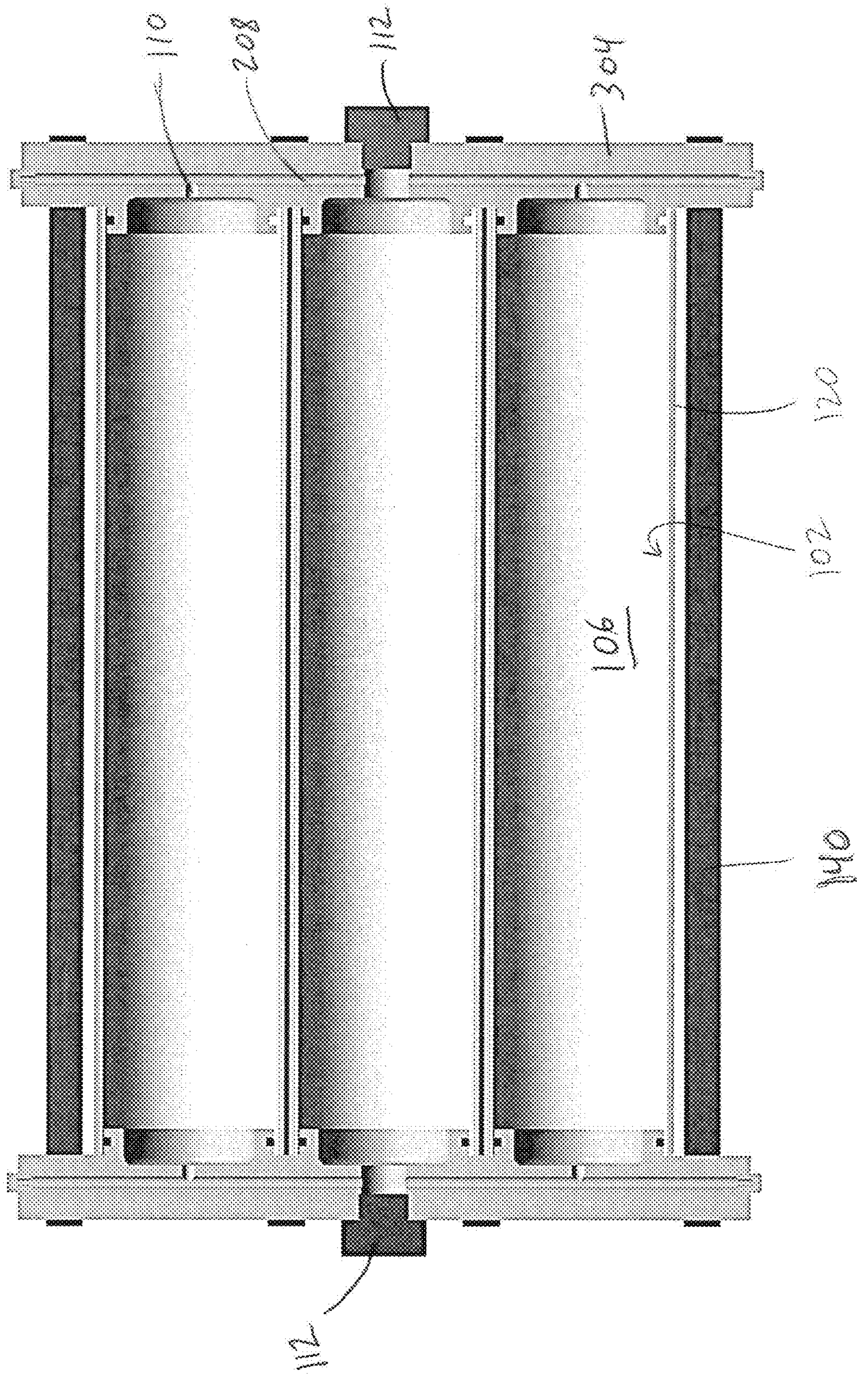
FIG. 14 depicts a top plan cross-sectional view of the assembly of FIGS. 12 and 13.

Referring to FIGS. 12A-14, an alternative aspect is disclosed that shows an assembly 300 that includes a plurality of vessels 100. Although the figures show three vessels 100, it will be appreciated that any other suitable number of vessels 100 could be utilized. The assembly 300 includes an end cap 304. Although the end cap 304 may serve similar functional purposes as the end caps 104 or 204, the end cap 304 is designed to interact with the second wrappings 140 in a different way. It will be understood that the end cap 304 is an alternative arrangement of components and does not limit the disclosed assemblies or vessels to the specific shown dimensions. As shown in FIGS. 12-14, the end cap 304 may be a unitary piece of multiple end caps that is used with a plurality of separate vessels 100. The second wrapping 140 may extend around the end cap 304 to provide sufficient axial tensile force on the vessel 100 to prevent "blow out" or gas leakage. The end cap 304 may include a channel 150 defined thereon and configured to receive the second wrapping 140. The channel 150 may have walls 152 and a floor 154 as described above, or, in some aspects, the channel 150 on the end cap 304 may be a designated surface configured to contact the second wrapping 140. The end cap 304 forms an elongated structure with curved regions 122 extending beyond the channel 150 and second wrappings 140 into a clear zone 124 wherein none of the second wrappings extend beyond the clear zone 124 whereby the curved regions 122 may be bumped or contacted and the second wrappings are not bumped or contacted.

The end cap 304 may include a projection 312 extending therefrom, and projection has a head 313 which also extends beyond the second wrapping and may be bumped without having the second wrapping contacted, that is configured to receive the second wrapping 140 and to distribute the applied forces from the second wrapping 140 throughout the end cap 304. As shown in FIGS. 12-14, each end cap 304 may include two projections 312 arranged opposite one another. Depending on the design of the vessels 100, the materials and dimensions of the second wrappings 140, and on the force required from the second wrappings 140, the assembly 300 may include second wrappings 140 that extend only around the projections 312, only around the end cap 304 (e.g. in the channel 150), or both around the projections 312 and in the channels.

The end cap 304 may define a fluid passage 208 that is configured to engage with the port 110 of each of the vessels 100 connected thereto. An actuator or valve 112 may be disposed on the assembly 300, for example on one of the end caps 304, and be in fluid communication with the passage 208.

Arrangements of the end caps 104, 204, 304 and the second wrappings 140 as described throughout this application allow for various advantages over existing technology. The axially oriented external carbon fibers decrease the required number of the less-efficient low-angle helical windings in a pressure vessel, and due to the presence of the second wrappings 140, the first wrapping 120 may decrease the number of, or exclude entirely, helical-type wrappings. This reduces unnecessary materials, reduces the thickness and physical footprint of the vessel 100, and reduces the overall weight of the vessel 100. The second wrapping 140 provides better resistance against axial forces than comparable helical-type winding present in the existing technology. This results in more efficiency of the vessel, higher burst pressure ratings, and differently shaped COPVs (e.g., axially longer with a narrower diameter than existing options). Such aspects would further be advantageous because they would increase gas storage density in the vessel, reduce shear load on the polar boss, and decrease chances of boss blowout failure. Utilizing the second wrappings 140 as described herein would decrease axial expansion of the vessel 100 by continually applied sufficient tensile force onto the end caps 104.

This disclosure is further directed to methods of manufacturing vessels described herein. In some aspect, a vessel 100 may be manufactured by providing a liner 102 as disclosed above and applying a first wrapping 120 circumferentially around the liner 102. The first wrapping 120 can be wound around the liner 102 circumferentially. The fibers of the first wrapping 120 that are configured to reinforce the circumferential load (i.e. the "hoop" style wrapping) are oriented such that they are positioned radially around the central axis A defined through the chamber 106 of the liner 102. Multiple layers or plies may be applied to the liner 102, and the step of applying the first wrapping 120 may be repeated as many times as needed to achieve the desired number of plies of the first wrapping 120 or the total thickness of the first wrapping 120. The method further includes the step of applying a second wrapping 140 around the liner 102 axially. The second wrapping 140 including a plurality of fibers that are oriented parallel to the central axis A. The step of applying the second wrapping 140 may be repeated as many times as needed to achieve the desired thickness of the second wrapping 140. In some aspects, multiple second wrappings 140 may be applied to the vessel 100 in substantially the same way. In some aspects, the step of applying the second wrapping 140 includes disposing the second wrapping 140 in a channel 150 defined on one or more of the end caps 104. When the vessel 100 is prepared and the sufficient number of first wrappings 120 and second wrappings 140 has been applied, the chamber 106 may be filled with the gas. The filling step may be completed by moving an actuator or valve 112 into the open position (if it is not already in the open position) and introducing gas into the port 110, which is fluidly connected to the chamber 106. When the desired amount of gas has been introduced into the chamber 106, the actuator or valve 112 may be moved to the closed configuration to prevent the gas from leaving the vessel 100. To release or utilize the gas stored in the vessel 100, the actuator or valve 112 may be moved to the open configuration, and the gas may be permitted to leave the chamber 106. In some aspects, a second port 110 may be disposed on the vessel 100, such that separate ports 110 are used to perform the filling step and to perform the releasing step.

Additional exemplary scenarios are described below in addition to the above disclosure. Each of these scenarios can be stand-alone or can be combined with one, multiple, or all of the other scenarios disclosed.

Scenario 1. A pressurized-gas storage vessel comprising: a liner defining a chamber therein, the chamber being configured to receive a gas; a first wrapping surrounding the liner; and a second wrapping surrounding the liner.

Scenario 2. The storage vessel of scenario 1, wherein the first wrapping is between the second wrapping and the liner.

Scenario 3. The storage vessel of scenario 1 or 2, wherein the storage vessel has a first end and a second end opposite the first end, the storage vessel being cylindrical and defining a central axis extending between the first and second ends through the center of the chamber.

Scenario 4. The storage vessel of scenario 3, further comprising a first end cap at the first end and a second end cap at the second end.

Scenario 5. The storage vessel of scenario 4, wherein at least one of the first and second end caps defines a channel configured to receive the second wrapping.

Scenario 6. The storage vessel of any of the preceding scenarios, wherein the vessel includes a plurality of second wrappings.

Scenario 7. The storage vessel of scenario 6, wherein the vessel includes two second wrappings that are disposed to intersect one another on the first and second end caps.

Scenario 8. The storage vessel of any of the preceding scenarios, further comprising a port in fluid communication with the chamber, the port being openable to atmosphere.

Scenario 9. The storage vessel of scenario 8, further comprising an actuator configured to selectively open and close the port, the actuator having an open configuration and a closed configuration, wherein in the open configuration, the gas is permitted to pass through the actuator, and in the closed configuration, the gas is prevented from passing through the actuator.

Scenario 10. The storage vessel of scenario 9, wherein the actuator is disposed on one of the first and second end caps.

Scenario 11. The storage vessel of any of the preceding scenarios, wherein one of the first wrapping and the second wrapping is configured to resist pressure extending radially from the chamber in a first direction perpendicular to the central axis, and wherein the other of the first wrapping and the second wrapping is configured to resist pressure extending axially from the chamber in a second direction parallel to the central axis.

Scenario 12. The storage vessel of scenario 11, wherein the first wrapping is configured to resist pressure extending radially, and the second wrapping is configured to resist pressure extending axially.

Scenario 13. The storage vessel of any preceding scenario, wherein the liner includes steel.

Scenario 14. The storage vessel of any preceding scenario, wherein the liner includes aluminum.

Scenario 15. The storage vessel of any preceding scenario, wherein the liner includes plastic.

Scenario 16. The storage vessel of any preceding scenario, wherein the liner includes a composite of metal and plastic.

Scenario 17. The storage vessel of any preceding scenario, wherein the liner is corrosion-resistant to natural gas and hydrogen gas.

Scenario 18. The storage vessel of any preceding scenario, wherein the end cap includes steel.

Scenario 19. The storage vessel of any preceding scenario, wherein the end cap includes aluminum.

Scenario 20. The storage vessel of any preceding scenario, wherein the end cap includes plastic.

Scenario 21. The storage vessel of any preceding scenario, wherein the end cap includes a composite of metal and plastic.

Scenario 22. The storage vessel of any preceding scenario, wherein the gas received in the chamber is hydrogen gas.

Scenario 23. The storage vessel of any preceding scenario, wherein the gas received in the chamber is natural gas.

Scenario 24. The storage vessel of any preceding scenario, wherein at least one of the first and second end caps is dome-shaped.

Scenario 25. The pressurized-gas storage vessel of any preceding scenario, wherein the first wrapping includes a plurality of carbon fibers held together by a resin.

Scenario 26. The storage vessel of any preceding scenario, wherein the second wrapping includes a plurality of carbon fibers held together by a resin.

Scenario 27. The storage vessel of any preceding scenario, wherein the first wrapping includes between 30 and 150 total plies.

Scenario 28. The storage vessel of any preceding scenario, wherein the first wrapping includes between 60 and 120 total plies.

Scenario 29. The storage vessel of any preceding scenario, wherein the first wrapping includes hoop style and helical style wrappings, the hoop style wrapping comprising more than 50% of the first wrapping.

Scenario 30. The storage vessel of any preceding scenario, wherein the first wrapping includes hoop style and helical style wrappings, the hoop style wrapping comprising more than 75% of the first wrapping.

Scenario 31. The storage vessel of any preceding scenario, wherein the first wrapping includes hoop style and helical style wrappings, the hoop style wrapping comprising more than 90% of the first wrapping.

Scenario 32. The storage vessel of any preceding scenario, wherein the first wrapping includes hoop style wrappings and is devoid of helical style wrappings.

Scenario 33. A pressure vessel assembly comprising: a first pressurized-gas storage vessel defining a first chamber therein, the first chamber being configured to receive a gas; a second pressurized-gas storage vessel defining a second chamber therein, the second chamber being configured to receive a gas; and a passage extending between the first and the second pressurized-gas storage vessels, such that the first chamber and the second chamber are in fluid communication.

Scenario 34. The assembly of scenario 33, further comprising a valve in fluid communication with the passage, the valve having an open configuration and a closed configuration, wherein in the open configuration, the gas from at least one of the first chamber and the second chamber is permitted to move through the valve, and in the closed configuration, the gas from at least one of the first chamber and the second chamber is precluded from moving through the valve.

Scenario 35. The assembly of scenario 33 or 34, wherein the first pressurized-gas storage vessel includes a first liner that defines the first chamber therein, a first wrapping disposed around the first liner, and a second wrapping disposed around the first wrapping on the first liner, and wherein the second pressurized-gas storage vessel includes a second liner that defines the second chamber therein, a first wrapping disposed around the second liner, and a second wrapping disposed around the first wrapping on the first liner.

Scenario 36. The assembly of any of scenarios 33 to 35, wherein each of the first and second pressurized-gas storage vessels is cylindrical.

Scenario 37. The assembly of any of scenarios 33 to 36, further comprising a first end cap at a first end of the assembly and a second end cap at a second end of the assembly opposite the first end, such that the first and second pressurized-gas storage vessels are disposed between the first and second end caps.

Scenario 38. The assembly of scenario 37, wherein the first end cap and the second end cap define a channel configured to receive the second wrapping.

Scenario 39. The assembly of any of scenarios 33 to 38, further comprising a projection extending therefrom, the projection being configured to receive the second wrapping thereon.

Scenario 40. The assembly of scenario 39, wherein the projection extends from each of the first and second end cap.

Scenario 41. The assembly of scenario 39 or 40, wherein each of the first and second end caps includes a plurality of the projections.

Scenario 42. The assembly of any of scenarios 33 to 41, further comprising a sleeve configured to receive the assembly therein.

Scenario 43. A method of forming a pressurized-gas storage vessel configured to receive a gas therein, the method comprising: providing a liner having a first end and a second end opposite the first end, the liner defining a chamber therein and defining a central axis extending through the center of the chamber between the first end and the second end; applying a first wrapping circumferentially around the liner, the first wrapping including a plurality of fibers being arranged radially around the central axis; and applying a second wrapping around the liner axially, the second wrapping including a plurality of fibers, wherein at least some of the plurality of fibers of the second wrapping are parallel to the central axis.

Scenario 44. The method of scenario 43, wherein the step of applying the first wrapping is repeated a predetermined number of times.

Scenario 45. The method of scenario 43 or 44, wherein the step of applying the second wrapping is repeated a predetermined number of times.

Scenario 46. The method of any of scenarios 43 to 45, wherein the pressurized-gas storage vessel includes a first end cap at the first end and a second end cap at the second end, and where the step of applying the second wrapping includes disposed the second wrapping in a channel defined on the first end cap and the second end cap.

Scenario 47. The method of any of scenarios 43 to 46, further comprising introducing a gas into the chamber defined by the liner.

While systems and methods have been described in connection with the various aspects of the various figures, it will be appreciated by those skilled in the art that changes could be made to the aspects without departing from the broad inventive concept thereof. It is understood, therefore, that this disclosure is not limited to the particular aspects disclosed, and it is intended to cover modifications within the spirit and scope of the present disclosure as defined by the claims.

What is claimed:

1. A pressurized-gas storage system (300) for containing a plurality of vessels (100), the system comprising:

plurality of cylindrical vessels, each cylindrical vessel comprising; a liner defining a chamber therein, the chamber being configured to receive a gas;

a first wrapping surrounding the liner; and a first unitary end cap at a first end of the plurality of vessels;

a second unitary end cap at a second end of the plurality of vessels; wherein each of said unitary end caps is a single piece which connects to said first end or said second end of said plurality of vessels;

each end cap has a curved region (122) extending into a clear zone (124);

a plurality of channels (150) in said first and second end caps, each channel being configured to receive one of a plurality of second wrappings;

wherein the plurality of channels and second wrappings are configured to be narrower than said end caps wherein the curved regions extend beyond the second wrappings;

at least one passage in at least one of the first and second end caps in fluid communication with all of said plurality of vessels; and, wherein each one of the plurality of second wrappings extends around the unitary end caps below the clear zone.

2. The pressurized-gas storage system of claim 1 wherein:

at least one of the first and second end caps comprises a flush surface when the second wrapping is in a channel of the plurality of channels; and, wherein said flush surface eliminates exposed edges of the unitary end caps adjacent to the channel.

3. The pressurized-gas storage system of claim 1, further comprising a port fluidly connected to said at least one passage and in fluid communication with the chamber of one of the plurality of vessels, the port being openable to atmosphere.

4. The pressurized-gas storage system of claim 1, wherein the liner includes one of steel, aluminum, plastic, and a composite of metal and plastic.

5. The pressurized-gas storage system of claim 1, wherein the first wrapping includes between 30 and 150 total plies.

6. The pressurized-gas storage system of claim 1, wherein the first wrapping includes hoop style and helical style wrappings, the hoop style wrapping comprising more than 50% of the first wrapping.

7. The pressurized-gas storage system (300) of claim 1, wherein the first wrapping includes hoop style and helical style wrappings, the hoop style wrapping comprising more than 90% of the first wrapping.

8. The pressurized-gas storage system of claim 1, wherein the first wrapping includes hoop style wrappings and is devoid of helical style wrappings.

9. The pressurized-gas storage system of claim 1, wherein the plurality of second wrapping and each end cap are configured to distribute the applied forces from the second wrapping throughout each end cap.

10. The pressurized-gas storage system of claim 1, further comprising at least one projection with a head (313) extending from each of the first and second end caps opposite each other configured to receive the second wrapping.

11. The pressurized gas storage system of claim 10, wherein the projections distribute the applied force of the second wrapping throughout each end cap.

* * * * *